United States Patent
Kubota et al.

(10) Patent No.: US 11,699,832 B2
(45) Date of Patent: Jul. 11, 2023

(54) BATTERY MODULE

(71) Applicant: VEHICLE ENERGY JAPAN INC., Hitachinaka (JP)

(72) Inventors: Osamu Kubota, Hitachinaka (JP); Kazunori Ojima, Hitachinaka (JP); Yoshitaka Watahiki, Hitachinaka (JP); Takashi Suzuki, Hitachinaka (JP)

(73) Assignee: VEHICLE ENERGY JAPAN INC., Hitachinaka (JP)

(*) Notice: Subject to any disclaimer, the term of this patent is extended or adjusted under 35 U.S.C. 154(b) by 258 days.

(21) Appl. No.: 16/633,116

(22) PCT Filed: Aug. 3, 2018

(86) PCT No.: PCT/JP2018/029176
§ 371 (c)(1),
(2) Date: Jan. 22, 2020

(87) PCT Pub. No.: WO2019/054079
PCT Pub. Date: Mar. 21, 2019

(65) Prior Publication Data
US 2021/0159572 A1  May 27, 2021

(30) Foreign Application Priority Data
Sep. 14, 2017 (JP) .............................. JP2017-176754

(51) Int. Cl.
*H01M 50/507* (2021.01)
*H01M 50/517* (2021.01)
(Continued)

(52) U.S. Cl.
CPC ....... *H01M 50/507* (2021.01); *H01M 50/204* (2021.01); *H01M 50/209* (2021.01); *H01M 50/517* (2021.01); *H01M 50/543* (2021.01)

(58) Field of Classification Search
CPC ......... H01M 10/60–627; H01M 10/65; H01M 10/653; H01M 10/655–656;
(Continued)

(56) References Cited

U.S. PATENT DOCUMENTS

2013/0022859 A1* 1/2013 Lim .................. H01M 10/0585
429/159
2015/0144409 A1* 5/2015 Fujii ..................... H01M 50/519
429/121
(Continued)

FOREIGN PATENT DOCUMENTS

CN 205863576 U 1/2017
EP 3 163 650 A1 5/2017
(Continued)

OTHER PUBLICATIONS

Machine Translation of Isobe, JP 2016-046234, originally published Apr. 4, 2016. (Year: 2016).*

(Continued)

*Primary Examiner* — Jonathan Crepeau
*Assistant Examiner* — Jacob Buchanan
(74) *Attorney, Agent, or Firm* — Foley & Lardner LLP

(57) ABSTRACT

To prevent an increase in the electrical resistance between a terminal for external connection and a cell terminal of a battery cell of a battery cell group. A battery module 100 includes a battery cell group 10, a pair of end plates 20, a bus bar 30, and a fastening member 40. The end plate 20 includes a recess 21 adapted to partially house the fastening member 40 in a mutually movable manner in one direction (X-direction) corresponding to the stacked direction of the plurality of battery cells 1. The battery module 100 also has a gap S between an inner side wall 21*a* of the recess 21 and the fastening member 40 in the one direction (X-direction).

12 Claims, 9 Drawing Sheets

(51) Int. Cl.
*H01M 50/543* (2021.01)
*H01M 50/209* (2021.01)
*H01M 50/204* (2021.01)

(58) Field of Classification Search
CPC .......... H01M 50/20–211; H01M 50/218–298; H01M 50/50–526; H01M 50/543; B60L 50/60; B60L 50/64–66
See application file for complete search history.

(56) References Cited

U.S. PATENT DOCUMENTS

| | | | |
|---|---|---|---|
| 2015/0295214 A1* | 10/2015 | Cho | H01M 50/20 |
| | | | 429/151 |
| 2016/0226054 A1* | 8/2016 | Kusama | H01M 50/209 |
| 2018/0040872 A1* | 2/2018 | Hidaka | H01M 50/516 |
| 2018/0175362 A1* | 6/2018 | Hara | H01M 50/502 |
| 2019/0334154 A1* | 10/2019 | Bollmann | H01M 50/502 |
| 2020/0099027 A1* | 3/2020 | Ishibashi | H01M 50/264 |
| 2021/0305646 A1* | 9/2021 | Kubota | H01M 50/543 |

FOREIGN PATENT DOCUMENTS

| | | | | |
|---|---|---|---|---|
| EP | 3 522 252 A1 | | 8/2019 | |
| JP | 2015-156303 A | | 8/2015 | |
| JP | 2016046234 | * | 4/2016 | ............. H01M 2/10 |
| JP | 2017-117574 A | | 6/2017 | |
| WO | WO-2018061477 A1 | * | 4/2018 | ............. H01M 2/10 |
| WO | WO-2018130359 A1 | * | 7/2018 | .......... H01M 50/543 |
| WO | WO-2018235556 A1 | * | 12/2018 | ............... B60K 6/28 |

OTHER PUBLICATIONS

Extended European Search Report dated May 19, 2021, in European Application No. 18856489.2 (8 pages).
Chinese Office Action dated Nov. 25, 2021, in Chinese Application No. 201880047543.5 (12 pages).

* cited by examiner

BATTERY MODULE

TECHNICAL FIELD

The present invention relates to a battery module including a plurality of battery cells.

BACKGROUND ART

Conventionally, inventions related to battery systems that are mainly used for hybrid vehicles or electric vehicles are known (see Patent Literature 1 below). The conventional battery system disclosed in Patent Literature 1 includes a battery cell block, a pair of end plates, coupling members, and an output line (see claim 1 and the like of Patent Literature 1). The battery cell block includes stacked battery cells. The pair of end plates are arranged facing the battery cell block, and fix the stacked battery cells together in the stacked direction thereof by tightly sandwiching them. The coupling members couple the pair of end plates together. The output line is coupled to an electrode terminal of a battery cell of the battery cell block.

The conventional battery system has the following configuration. The output line is coupled to the electrode terminal of the battery cell via a junction bus bar that is coupled to the electrode terminal of the battery cell. A connection terminal of the output line is coupled to the junction bus bar via a fastening screw and a nut screwed around the fastening screw. In addition, the nut is non-rotatably fixed to each end plate. The fastening screw is screwed into the nut so as to be fixed to the end plate, and the fastening screw and the nut together couple the junction bus bar to the connection terminal of the output line so as to fix them to the end plate.

The conventional battery system with such a configuration can realize an ideal coupled state of the output line by reliably and stably coupling the connection terminal of the output line to the junction bus bar at small contact resistance while avoiding damages to the electrode terminal of the battery cell. This is because in the conventional battery system, tightening torque of the fastening screw and the nut for coupling the output line to the junction bus bar will prevent unwanted rotational torque from acting on the electrode terminal (see paragraph 0008 and the like of Patent Literature 1).

In addition, in the conventional battery system, the junction bus bar is coupled to the electrode terminal. Specifically, the junction bus bar can be coupled to the electrode terminal of the battery cell while being coupled to the end plate via the fastening screw. Therefore, the electrode terminal will not be damaged due to tightening torque for coupling the junction bus bar to the electrode terminal. This is because the junction bus bar can be coupled to the electrode terminal while being fixed in a non-rotating state (see paragraph 0008 and the like of Patent Literature 1).

Further, in the conventional battery system, since the nut is non-rotatably fixed to the end plate, the junction bus bar will not rotate due to tightening torque for screwing the fastening screw into the nut and thus, the junction bus bar will not apply an unwanted force to the electrode terminal (see paragraph 0009 and the like of Patent Literature 1).

CITATION LIST

Patent Literature

Patent Literature 1: JP 2010-080353 A

SUMMARY OF INVENTION

Technical Problem

In the conventional battery system, when the battery cells of the battery cell block expand in the stacked direction thereof due to charging or a temperature rise, for example, the pair of end plates, which fix the stacked battery cells together in the stacked direction thereof by tightly sandwiching them, become warped. Herein, the connection terminal of the output line is coupled to the junction bus bar via the fastening screw and the nut screwed around the fastening screw. Therefore, once the pair of end plates become warped, there is a possibility that stress would act on the fastening screw via the junction bus bar that is fixed to the pair of end plates via the fastening screw, which in turn may cause loosening of the fastening screw fastened to the nut. Then, electrical resistance between the output line and the electrode terminal of the battery cell of the battery cell block may increase.

The present invention provides a battery module that can overcome the problems with the conventional battery system.

Solution to Problem

A battery module of the present invention is a battery module that includes a battery cell group including a plurality of battery cells stacked in one direction and coupled together, a pair of end plates sandwiching the battery cell group from opposite sides thereof in the one direction, a bus bar for coupling the battery cell group to a terminal for external connection, and a fastening member for fastening the terminal to the bus bar, in which the end plate has a recess adapted to partially house the fastening member in a mutually movable manner in the one direction, and a gap is provided between an inner side wall of the recess and the fastening member along the one direction.

Advantageous Effects of Invention

The battery module of the present invention can prevent loosening of each fastening member, which in turn can reduce contact resistance between the terminal for external connection and each bus bar and thus prevent an increase in the electrical resistance between the terminal for external connection and a cell terminal of the battery cell of the battery group.

DESCRIPTION OF EMBODIMENTS

Hereinafter, an embodiment of a battery module of the present invention will be described with reference to the drawings.

Figure 1:
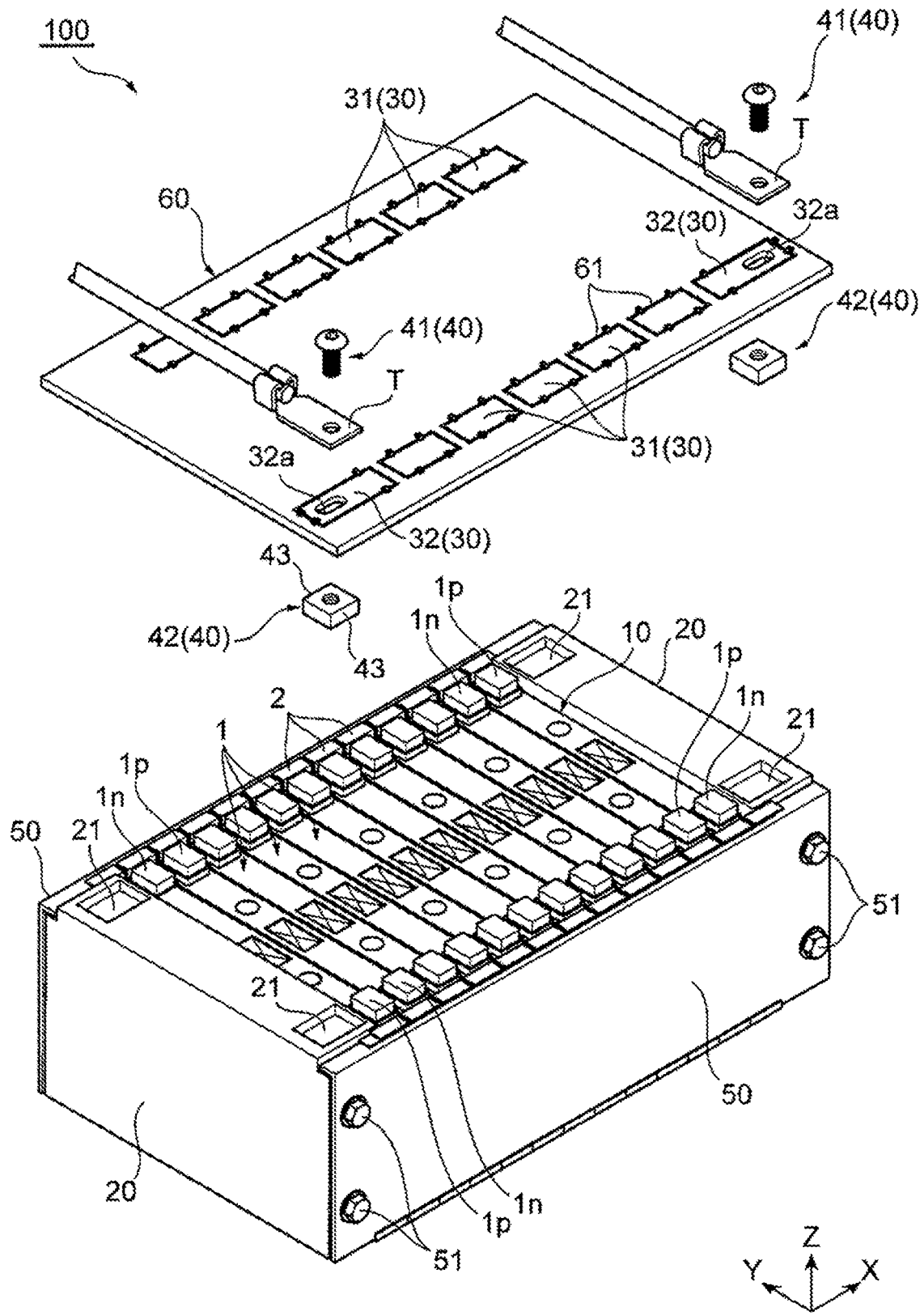
FIG. 1 is an exploded perspective view of a battery module according to an embodiment of the present invention.
Figure 2:
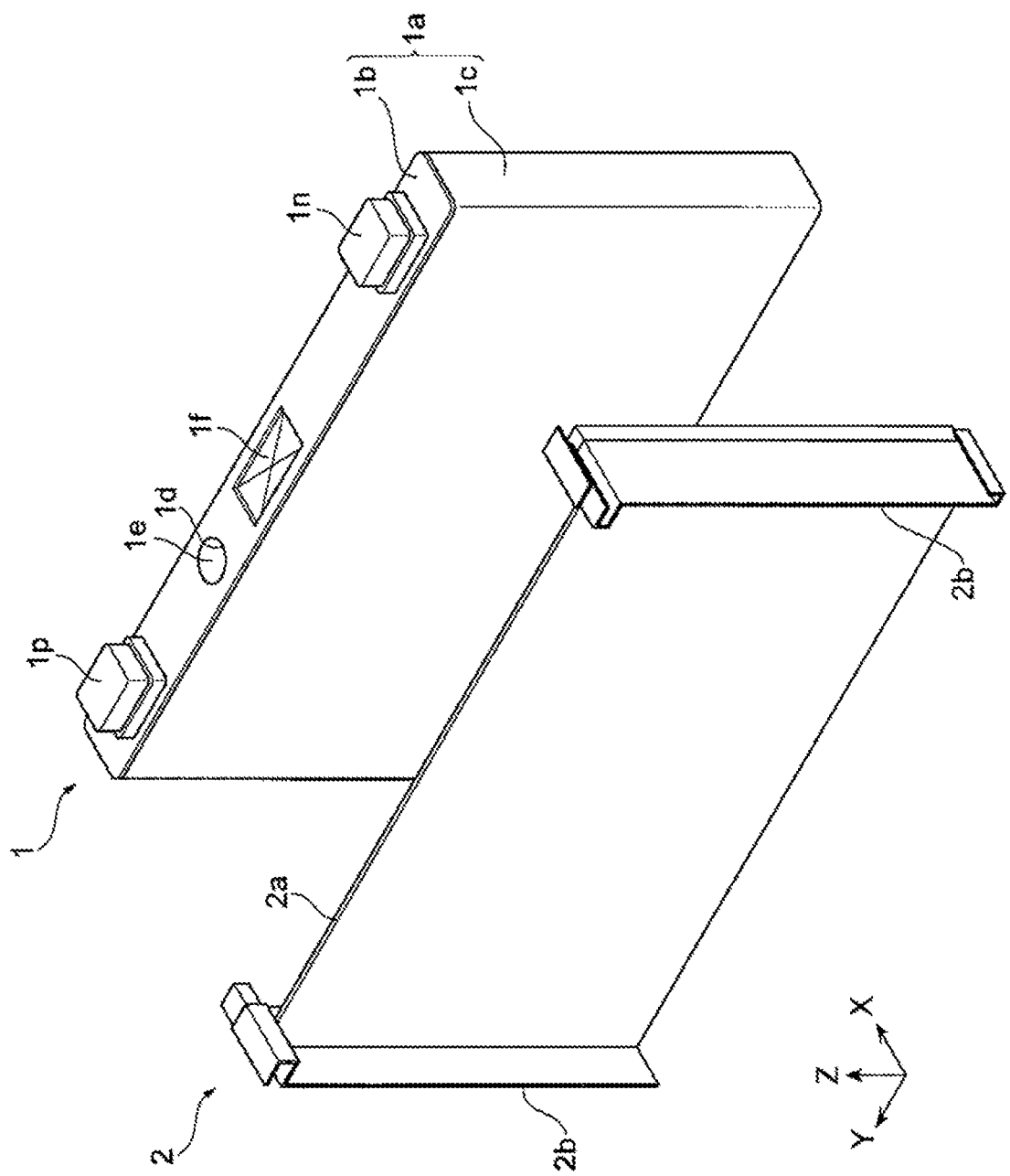
FIG. 2 is a perspective view of a battery cell and a cell holder of the battery module illustrated in FIG. 1.

FIG. 1 is an exploded perspective view of a battery module 100 according to an embodiment of the present invention. FIG. 2 is a perspective view of a battery cell 1 of the battery cell group 10 and a cell holder 2 in the battery module 100 illustrated in FIG. 1. The battery module 100 of the present embodiment mainly includes a battery cell group 10, a pair of end plates 20, bus bars 30, and fastening members 40. Further, in the example illustrated in the drawing, the battery module 100 includes a pair of side plates 50 and a bus bar case 60.

Each drawing illustrates a rectangular coordinate system including an X-direction (i.e., one direction corresponding to the stacked direction of the plurality of battery cells 1 of the battery cell group 10), a Y-direction (i.e., the width direction of the battery cells 1), and a Z-direction (i.e., the height direction of the battery cells 1). In the following description, the configuration of each part of the battery module 100 of the present embodiment will be sometimes described using the XYZ rectangular coordinate system.

The battery module 100 of the present embodiment has the following configuration, though the details will be described later. The end plate 20 includes recesses 21 for partially housing the fastening members 40 in a mutually movable manner in the one direction (X-direction) corresponding to the stacked direction of the battery cells 1 of the battery cell group 10. A gap S is formed between an inner side wall 21a of each recess 21 and each fastening member 40 along the one direction (X-direction; see FIG. 3, for example). Hereinafter, the configuration of each part of the battery module 100 of the present embodiment will be described in detail.

The battery cell group 10 is formed by stacking the plurality of battery cells 1 in the one direction (X-direction). More specifically, the battery cell group 10 is formed by alternately stacking flat prismatic battery cells 1 and cell holders 2 in the thickness direction (X-direction) thereof, for example.

The battery cells 1 are prismatic lithium ion secondary battery cells each having a rectangular box shape, for example. Each battery cell 1 includes a thin battery cell container 1a with a generally rectangular parallelepiped shape, and a positive cell terminal 1p and a negative cell terminal 1n arranged on an outer face of the battery cell container 1a. The battery cell container 1a has a pair of wide side faces each having a relatively large area on opposite sides thereof in the thickness direction, and has a pair of narrow side faces each having a relatively small area on opposite sides thereof in the width direction (Y-direction), and further has thin, elongated rectangular top and bottom faces on opposite sides thereof in the height direction (Z-direction).

The battery cell container 1a is made of aluminum or aluminum alloy, for example, and includes a rectangular box-shaped battery can 1c having an opening at its top, and a rectangular plate-shaped battery lid 1b for closing the opening of the battery can 1c. The battery lid 1b is joined to the entire periphery of the opening of the battery can 1c using laser welding, for example, and thus seals the opening of the battery can 1c. The positive cell terminal 1p and the negative cell terminal 1n are provided apart from each other at opposite ends of an outer face of the battery lid 1b along the longitudinal direction, that is, at opposite ends of the battery cell container 1a along the width direction.

Though not illustrated, the battery cell container 1a houses an element to be charged/discharged, which has been obtained by winding positive and negative electrodes stacked with separators interposed therebetween, for example, and is in a state covered with an insulating resin case or sheet. The positive electrode and the negative electrode of the element to be charged/discharged are coupled to the positive cell terminal 1p and the negative cell terminal 1n via a positive current collector and a negative current collector, respectively. Each of the positive and negative current collectors is fixed to the battery lid 1b via an insulating member made of resin with an electrical insulating property, for example.

In addition, though not illustrated, the inside of the battery cell container 1a is filled with an electrolytic solution. The battery lid 1b has a liquid injection hole 1d drilled therethrough to be injected with an electrolytic solution at a position between the positive cell terminal 1p and the negative cell terminal 1n. The liquid injection hole 1d is hermetically closed and sealed with a liquid injection plug 1e joined thereto through laser welding, for example, after an electrolytic solution is injected into the battery cell container 1a. Examples of the electrolytic solution housed in the battery cell container 1a include a nonaqueous electrolytic solution obtained by dissolving a lithium salt, such as lithium hexafluorophosphate ($LiPF_6$), in a carbonic ester-based organic solvent, such as ethylene carbonate, for example.

In addition, the battery cell container 1a includes a gas discharge valve 1f in the center of the battery lid 1b in the longitudinal direction, for example. The gas discharge valve 1f can be formed by thinning a part of the plate-shaped battery lid 1b through press work, for example. The gas discharge valve 1f ruptures and opens when pressure inside the battery cell container 1a exceeds a predetermined level due to some abnormalities, such as overcharge, and thus releases the gas inside the battery cell container 1a to the outside, thereby reducing the pressure inside the battery cell container 1a.

The cell holders 2 are members made of resin with an insulating property and heat resistance, such as engineering plastics including polybutyrene terephthalate (PBT) and polycarbonate (PC), or rubber. The cell holders 2 are arranged on opposite sides of each individual battery cell 1 in the thickness direction thereof, and hold the individual battery cells 1 as well as electrically insulate the adjacent battery cells 1.

Each cell holder 2 includes a partition portion 2a adapted to face one of the wide side faces of each battery cell container 1a, and coupling portions 2b adapted to face the narrow side faces of the adjacent battery cell containers 1a. With the partition portion 2a, the wide side faces of the battery cell containers 1a of the adjacent battery cells 1 are prevented from abutting each other. Each coupling portion 2b includes a projection and a recess to allow the adjacent cell holders 2 to be coupled together.

The battery cell group 10 is formed by stacking the plurality of battery cells 1 in the thickness direction (X-direction) thereof while arranging the cell holder 2 between the adjacent battery cells 1 as described above, for example, such that the wide side faces of the battery cell containers 1a of the adjacent battery cells 1 face one another. The cell holders 2 are also arranged at opposite ends of the plurality of battery cells 1 in the stacked direction (X-direction) thereof. Though not illustrated, faces of the cell holders 2 at opposite ends of the battery cell group 10 that face the pair of end plates 20 are flat, for example. In addition, the positive cell terminals 1p and the negative cell terminals 1n of the battery cells 1 that are adjacent in the stacked direction (X-direction) thereof are arranged with their positions are alternately inverted so that the positive cell terminal 1p of one of the battery cells 1 and the negative cell terminal 1n of the other of the battery cells 1 are adjacent in the stacked direction (X-direction).

The pair of end plates 20 sandwich the battery cell group 10 from its opposite sides in the one direction (X-direction) corresponding to the stacked direction of the plurality of battery cells 1. Each end plate 20 is a rectangular plate-shaped member made of resin, such as polyphenylene sulfide (PPS) or fiber-reinforced plastics, for example. The shape and dimensions of each face of the end plate 20 facing the battery cell 1 of the electrode group are generally the same as those of each wide side face of the battery cell container 1a, for example. Though not illustrated, the pair of end plates 20 have nuts for fastening the side plates 50 to opposite side faces of the battery cells 1 along the one direction (X-direction) corresponding to the stacked direction of the battery cells 1. The nuts are embedded in the pair of end plates 20 through insert molding, for example.

The pair of side plates 50 are arranged at opposite sides of the battery cell group 10 in the width direction (Y-direction) of the battery cells 1. Each side plate 50 is a plate-shaped member with a generally rectangular shape whose longitudinal direction coincides with the one direction (X-direction) corresponding to the stacked direction of the battery cells 1. Each side plate 50 is produced by bending a thin portion of a stainless steel plate or a steel plate, for example, and includes bolt holes (not illustrated) for passing bolts 51 at its opposite ends in the longitudinal direction (X-direction). The pair of side plates 50 are fastened at their opposite ends in the longitudinal direction (X-direction) to the pair of end plates 20 as the bolts 51 passed through the bolt holes are fastened to the nuts embedded in the side faces of the pair of end plates 20. Accordingly, the pair of side plates 50 restrain the pair of end plates 20, which sandwich the battery cell group 10 in the one direction (X-direction) corresponding to the stacked direction thereof, in the one direction (X-direction).

The bus bars 30 include intermediate bus bars 31 coupling the plurality of battery cells 1 of the battery cell group 10 together, and end bus bars 32 for coupling the battery cell group 10 to terminals T for external connection, for example. Each intermediate bus bar 31 is an electrically conductive member made of metal, such as copper or aluminum, for example, and has a rectangular plate shape. Opposite ends of the intermediate bus bar 31 are joined to the positive cell terminal 1p of one of the adjacent battery cells 1 of the battery cell group 10 and the negative cell terminal 1n of the other of the adjacent battery cells 1, respectively, using laser welding, for example, and thus are coupled thereto.

As described above, the plurality of battery cells 1 of the battery cell group 10 are alternately inverted with their positive cell terminals 1p and negative cell terminals 1n arranged along the one direction (X-direction) corresponding to the stacked direction of the plurality of battery cells 1. Therefore, the plurality of battery cells 1 of the battery cell group 10 are coupled together in series as the positive cell terminal 1p of one of the adjacent battery cells 1 and the negative cell terminal 1n of the other of the adjacent battery cells 1 are sequentially coupled together by the intermediate bus bar 31 in the one direction (X-direction) corresponding to the stacked direction of the plurality of battery cells 1.

Each end bus bar 32 is an electrically conductive member made of metal, such as copper or aluminum, for example, and has a rectangular plate shape as with each intermediate bus bar 31. Each end bus bar 32 is longer in the longitudinal direction than each intermediate bus bar 31, for example, and has at its one end an elongated through-hole 32a for passing the fastening member 40. The elongated through-hole 32a extends in the one direction (X-direction). The end bus bar 32 for a positive electrode is joined to the positive cell terminal 1p of the battery cell 1 at one end in the stacked direction among the plurality of battery cells 1 of the battery cell group 10, which are coupled together in series by the intermediate bus bars 31, using laser welding, for example, while the end bus bar 32 for a negative electrode is joined to the negative cell terminal 1n of the battery cell 1 at the other end in the stacked direction using laser welding, for example.

Figure 3:
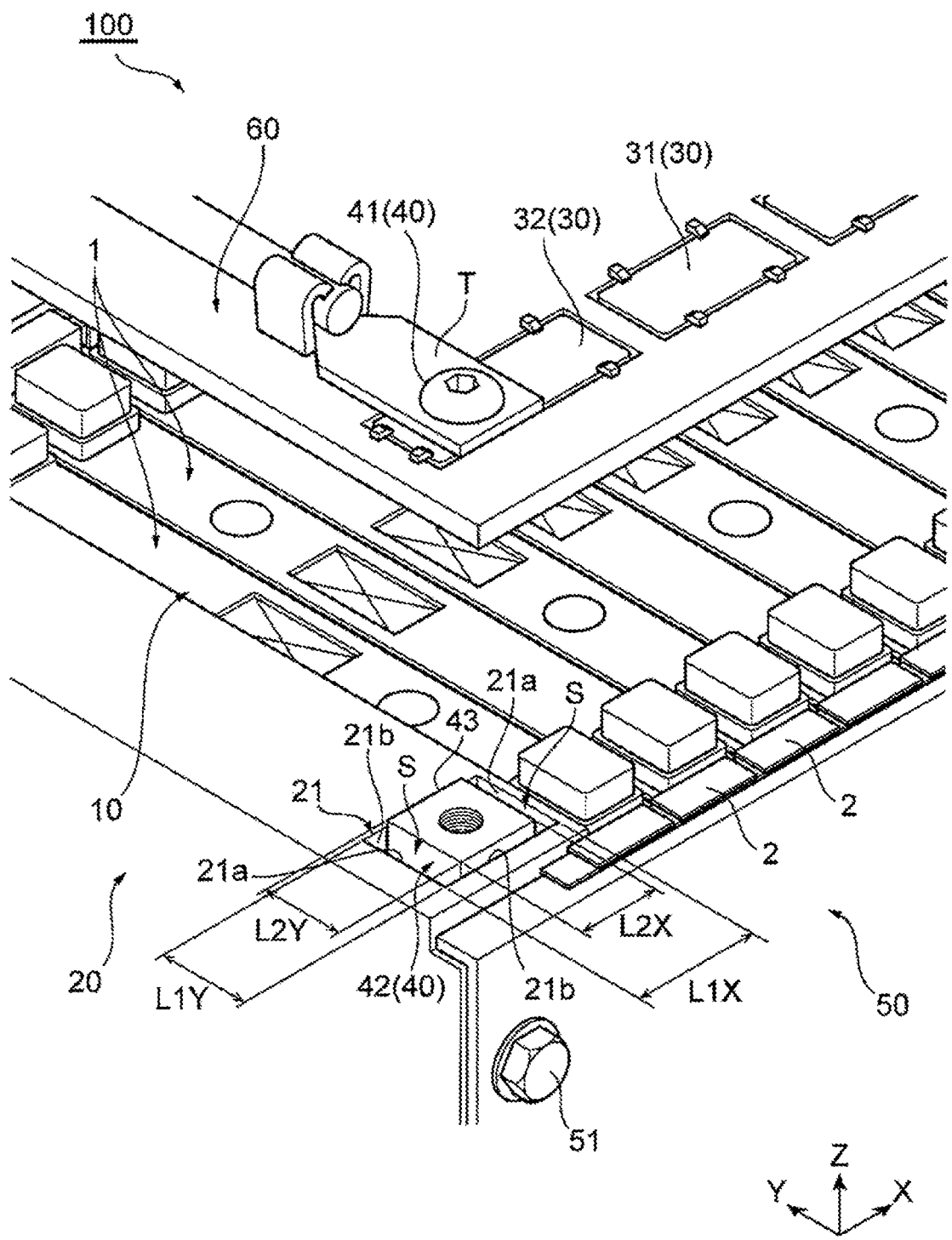
FIG. 3 is an enlarged exploded perspective view of the battery module illustrated in FIG. 1.
Figure 4:
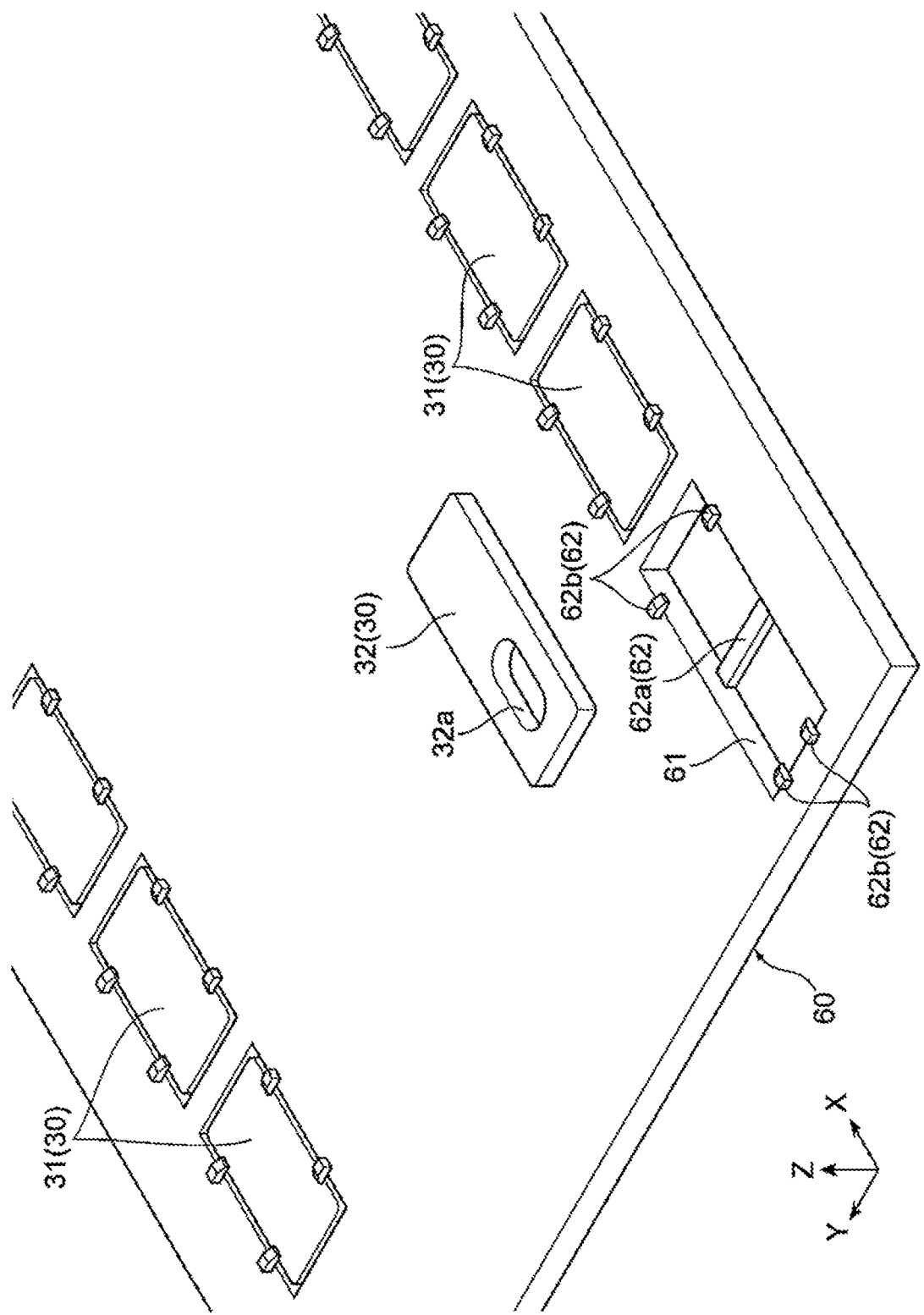
FIG. 4 is an exploded perspective view of a bus bar case and bus bars of the battery module illustrated in FIG. 3.

FIG. 3 is an enlarged exploded perspective view of the battery module 100 illustrated in FIG. 1. FIG. 4 is an exploded perspective view of the bus bar case 60 and the bus bars 30 of the battery module 100 illustrated in FIG. 3. The bus bar case 60 is a rectangular plate-shaped member made of resin with an insulating property and heat resistance, such as engineering plastics like polyethylene (PE) and polypropylene (PP), for example. The bus bar case 60 is arranged facing the cell terminals 1p and 1n of the plurality of battery cells 1 of the battery cell group 10 so as to cover the battery cell group 10 and the pair of end plates 20 arranged on the opposite sides thereof.

That is, the battery module 100 includes the bus bar case 60 adapted to be arranged facing the upper faces of the battery cells 1 and hold the bus bars 30. Then, the fastening members 40 are provided penetrating through bus bar case 60 and the bus bars 30. The bus bar case 60 is coupled to the pair of end plates 20 with the fastening members 40, for example. That is, the end plates 20 are arranged on the opposite sides in the stacked direction of the battery cells 1, and the pair of end plates 20 are coupled together with the bus bar case 60.

The opposite ends of the bus bar case 60 are arranged adjacent the recesses 21 of the end plates 20 that partially house the fastening members 40. The bus bar case 60 holds the plurality of bus bars 30 including the intermediate bus bars 31 and the end bus bars 32. The bus bar case 60 has a plurality of openings 61 adapted to house the plurality of bus bars 30, and also has support portions 62 adapted to hold the bus bars 30 in the respective openings 61. In the example illustrated in the drawings, the shapes and dimensions of the openings 61 are generally the same as those of the bus bars 30 housed in the openings 61. The support portions 62 are adapted to support each bus bar 30 from its opposite sides in the direction (Z-direction) in which the bus bar 30 is fastened to a terminal T for external connection with the fastening member 40.

More specifically, the support portions 62 include a beam-like portion 62a adapted to support each bus bar 30 from its opposite sides in the direction (Z-direction) in which the bus bar 30 is fastened to a terminal T for external connection with the fastening member 40, for example, and a plurality of protruding portions 62b. The beam-like portion 62a is arranged in the center of the opening 61 in the one direction (X-direction) corresponding to the stacked direction of the battery cells 1 so as to cross the opening 61, on the side of the battery cell group 10 (on the side of the −Z-direction). The plurality of protruding portions 62b are provided so as to protrude inward of each opening 61 at opposite ends of the opening 61 in the one direction (X-direction), on the side opposite to the battery cell group 10 (on the side of the +Z-direction).

Figure 5:
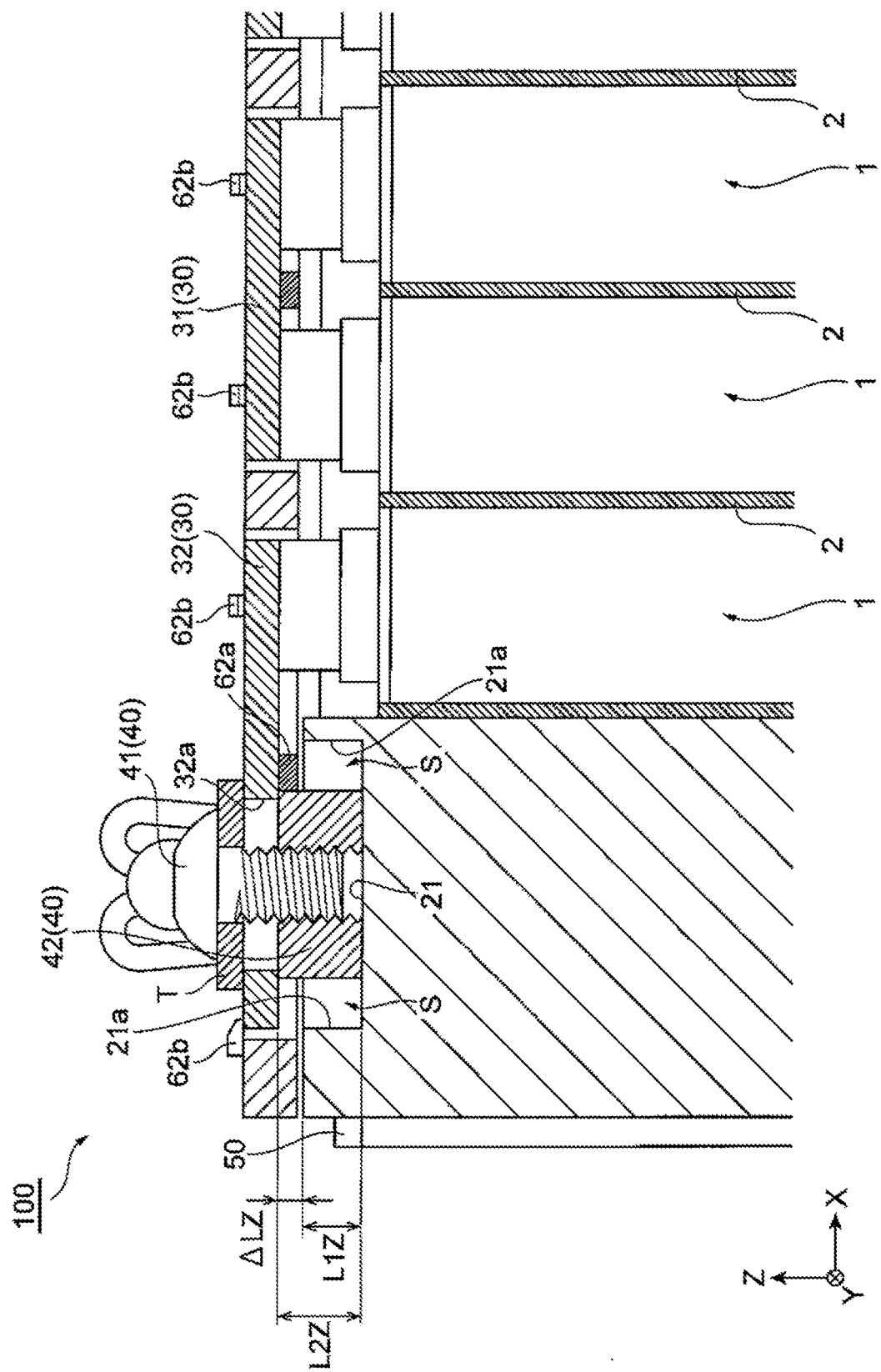
FIG. 5 is an enlarged cross-sectional view of the battery module illustrated in FIG. 1.

FIG. 5 is an enlarged cross-sectional view of the battery module 100 illustrated in FIG. 1. The fastening member 40 is a member for fastening a terminal T for external connection to the bus bar 30. The fastening member 40 includes a metal bolt 41 and a metal nut 42, for example. In the example illustrated in the drawing, the bolt 41 has a pan head or a truss head, but the structure of the bolt 41 is not limited thereto, and a hexagon headed bolt with a hexagon head or a bolt with a square head or a head with other shapes may also be used. Although the nut 42 in the example illustrated in the drawing is square in shape, other shapes such as a hexagonal shape may also be used. It should be noted that the fastening member 40 is not limited to the bolt 41 and the nut 42, and other fastening means, such as a rivet, a swaged portion, and a welded portion, may also be used.

As described above, at least one of the pair of end plates 20 includes the recess 21 that is adapted to partially house the fastening member 40 in a mutually movable manner in the one direction (X-direction) corresponding to the stacked direction of the battery cells 1. That is, either one or both of the pair of end plates 20 may be provided with the recess 21. In the example illustrated in the drawing, the fastening member 40 includes the nut 42 adapted to be housed in the recess 21 of the end plate 20, and the bolt 41 adapted to be fastened to the nut 42. That is, the recess 21 of the end plate 20 is adapted to house the nut 42, winch is a part of the fastening member 40, in a mutually movable manner in the one direction (X-direction). The gap S is provided between the inner side wall 21a of the recess 21 of the end plate 20 and the nut 42 in the one direction (X-direction).

In the example illustrated in the drawing, the dimensions of the recess 21 of the end plate 20 and the dimensions of the nut 42 of the fastening member 40 have the following relationship. In the one direction (X-direction) corresponding to the stacked direction of the plurality of battery cells 1 of the battery cell group 10, the dimension L1X of the recess 21 is larger than the dimension L2X of the nut 42 of the fastening member 40 (L1X>L2X). In the width direction (Y-direction) of the battery cells 1, the dimension L1Y of the recess 21 is equal to or larger than the dimension L2Y of the nut 42 of the fastening member 40 (L1Y≥L2Y). In the height direction (Z-direction) of the battery cells 1, the dimension L1Z of the recess 21 is smaller than the dimension L2Z of the nut 42 of the fastening member 40 (L1Z<L2Z). That is, the nut 42 of the fastening member 40 protrudes to the outer side of the recess 21 by an amount corresponding to the difference $\Delta LZ$ (=L2Z−L1Z) between the dimension L1Z of the recess 21 and the dimension L2Z of the nut 42.

In addition, in the one direction (X-direction), a clearance between the recess 21 and the nut 42 of the fastening member 40 corresponds to the difference $\Delta LX$ (=L1X−L2X) between the dimension L1X of the recess 21 and the dimension L2X of the nut 42. Further, in the width direction (Y-direction) of the battery cells 1, a clearance between the nut 42 of the fastening member 40 and the recess 21 corresponds to the difference $\Delta LY$ (=L1Y−L2Y) between the dimension L1Y of the recess 21 and the dimension L2Y of the nut 42. The difference $\Delta LX$ corresponding to the clearance between the recess 21 and the nut 42 in the one direction (X-direction) is greater than the difference $\Delta LY$ corresponding to the clearance between the recess 21 and the nut 42 in the width direction (Y-direction) of the battery cells 1 ($\Delta LX > \Delta LY$). It should be noted that the difference $\Delta LY$ corresponding to the clearance between the recess 21 and the nut 42 in the width direction (Y-direction) of the battery cells 1 is several hundred μm at maximum, for example.

In the battery module 100 of the present embodiment, a part of the fastening member 40 housed in the recess 21 of the end plate 20 has an anti-rotation wall 43 that is adapted to be adjacent to the inner side wall 21b of the recess 21 along the one direction (X-direction) corresponding to the stacked direction of the plurality of battery cells 1 of the battery cell group 10 and faces the inner side wall 21b of the recess 21. More specifically, the nut 42 of the fastening member 40 housed in the recess 21 of the end plate 20 has the anti-rotation wall 43. The nut 42 is housed in the recess 21 in a state in which the anti-rotation wall 43 is generally parallel with the inner side wall 21b of the recess 21 along the one direction (X-direction) and contacts the inner side wall 21b or faces the inner side wall 21b with a minute gap interposed therebetween.

Hereinafter, the function of the battery module 100 according to the present embodiment will be described.

As described above, the battery module 100 of the present embodiment includes the battery cell group 10 obtained by coupling the plurality of battery cells 1 together by stacking them in the one direction, and the pair of end plates 20 sandwiching the battery cell group 10 from its opposite sides in the one direction. In addition, the battery module 100 of the present embodiment also includes the end bus bars 32 as the bus bars 30 for coupling the battery cell group 10 to terminals T for external connection, and the fastening members 40 for fastening the terminals T for external connection to the respective end bus bars 32.

In the battery cell group 10, the plurality of battery cells 1 are restrained in the one direction (X-direction) corresponding to the stacked direction thereof as the pair of side plates 50 are fastened to the pair of end plates 20 with the bolts 51, for example, while the plurality of battery cells 1 are pressurized in the stacked direction thereof between the pair of end plates 20. Accordingly, the battery cell group 10 is held between the pair of end plates 20 while being compressed by a predetermined compression amount in the one direction (X-direction).

The battery module 100 of the present embodiment is used for purposes of charging and discharging with a large current, such as in a power supply device of a hybrid vehicle, for example. In such a case, each end bus bar 32, which is the bus bar 30 for coupling the battery cell group 10 of the battery module 100 to a terminal T for external connection, should be coupled to a terminal T for external connection at an end of a cable with a relatively large diameter for a large current in a state in which electrical resistance is reduced as much as possible. To that end, the terminal T for external connection should be fastened to the end bus bar 32 for external connection of the battery cell group 10 with a strong force by the fastening member 40.

Herein, in the conventional battery system disclosed in Patent Literature 1, when the plurality of battery cells of the battery cell block expand in the stacked direction thereof due to charging or a temperature rise, for example, the pair of end plates, which fix the stacked battery cells together by tightly sandwiching them in the stacked direction thereof, become warped. The connection terminal of the output line is coupled to the junction bus bar via the fastening screw and the nut screwed around the fastening screw. Therefore, when the pair of end plates become warped, stress in the shear direction perpendicular to the axial direction will repeatedly act on the fastening screw via the junction bus bar that is fixed to one of the pair of end plates via the fastening screw, which in turn may cause loosening of the fastening screw fastened to the nut. Then, electrical resistance between the output line and the cell terminal of the battery cell of the battery cell block may increase.

In contrast, in the battery module 100 of the present embodiment, the end plate 20 has the recess 21 adapted to partially house the fastening member 40 in a mutually movable manner in the one direction (X-direction) corresponding to the stacked direction of the plurality of battery cells 1, as described above. The battery module 100 of the present embodiment has the gap S between the inner side wall 21a of the recess 21 and the fastening member 40 in the one direction (X-direction). Therefore, when the plurality of battery cells 1 of the battery cell group 10 expand in the one direction (X-direction) corresponding to the stacked direction, and the pair of end plates 20 become warped in the one direction (X-direction), the fastening member 40 will move relative to the end plates 20 in the one direction (X-direction).

This can relax stress acting on the fastening member 40 via the end bus bar 32 and a corresponding terminal T for external connection, thus preventing loosening of the fastening member 40. Therefore, the battery module 100 of the present embodiment can prevent an increase in the contact resistance between each bus bar 30 coupled to the battery cell group 10 and a corresponding terminal T for external connection. In addition, since each fastening member 40 can be moved relative to the end plates 20 in the one direction (X-direction) when each end bus bar 32 and a corresponding terminal T for external connection are coupled together with the fastening member 40 during production of the battery module 100, there is no need to perform accurate positioning of the end bus bar 32 and the fastening member 40. This can improve the productivity of the battery module 100.

More specifically, in the battery module 100 of the present embodiment, each fastening member 40 includes the nut 42 adapted to be housed in each recess 21 of the end plate 20, and the bolt 41 adapted to be fastened to the nut 42, and the gap S is provided between the inner side wall 21a of the recess 21 and the nut 42 in the one direction (X-direction). Accordingly, when the pair of end plates 20 become warped in the one direction (X-direction), each nut 42 will move relative to the end plates 20 in the one direction (X-direction), which in turn can relax stress acting on the fastening member 40 via each end bus bar 32 and a corresponding terminal for external connection, and thus can prevent loosening of the fastening member 40.

In addition, the battery module 100 of the present embodiment includes the bus bar case 60 adapted to be arranged adjacent to the recesses 21 of the end plate(s) 20 and hold the bus bars 30. The bus bar case 60 includes the support portions 62 adapted to support each bus bar 30 from its opposite sides in the direction in which the bus bar 30 and a corresponding terminal T for external connection are fastened together with each fastening member 40. Accordingly, the bus bar 30 can be held by the support portions 62 of the bus bar case 60. Therefore, shakes of each bus bar 30 can be prevented when the battery module 100 shakes, such as when the battery module 100 is mounted on a vehicle, for example, and thus, resistance against shakes of the battery module 100 can be improved.

In the conventional battery system disclosed in Patent Literature 1, a terminal is fixed to the nut provided on the end plate. However, in the conventional battery system, if a bus bar case is prepared first and a terminal is provided penetrating therethrough, positioning of a hole of the bus bar case and the nut will be difficult to perform. This is because dimension errors of the individual battery cells, which have been stacked, adversely affect the positions of the hole of the bus bar case and the nut.

In contrast, the battery module 100 of the present embodiment includes the bus bar case 60 adapted to be arranged facing the upper faces of the battery cells 1 and hold the bus bars 30, and the fastening members 40 are provided penetrating through the bus bar case 60 and the bus bars 30. In addition, the bus bar case 60 is coupled to the pair of end plates 20. That is, the end plates 20 are arranged on opposite sides in the stacked direction of the battery cells 1, and the pair of end plates 20 are coupled together with the bus bar case 60. Therefore, providing the gap S between the inner side wall 21a of each recess 21 and each fastening member 40 allows for positioning of a hole of the bus bar case 60 and the fastening member 40 even when there is a dimension error among the individual battery cells 1.

In addition, in the battery module 100 of the present embodiment, the nut 42 that is a part of each fastening member 40, which is adapted to be housed in each recess 21 of the end plate 20, includes the anti-rotation wall 43 adapted to be adjacent to the inner side wait 21b of the recess 21 along the one direction (X-direction) and face the inner side wall 21b. This can prevent rotation of the not 42 as a part of the fastening member 40, and thus can allow a reaction force against torque acting on the fastening member 40 to act on the anti-rotation wall 43 of the nut 42 from the inner side wall 21b of the recess 21 when a terminal T for external connection is coupled to each end bus bar 32 by screwing the bolt 41 into the nut 42.

As described above, the battery module 100 of the present embodiment can prevent loosening of each fastening member 40, reduce contact resistance between a terminal T for external connection and each bus bar 30, and prevent an increase in the electrical resistance between the terminal T for external connection and one of the cell terminals 1p and 1n of a battery cell 1 of the battery cell group 10.

Modified Example 1

Figure 6:
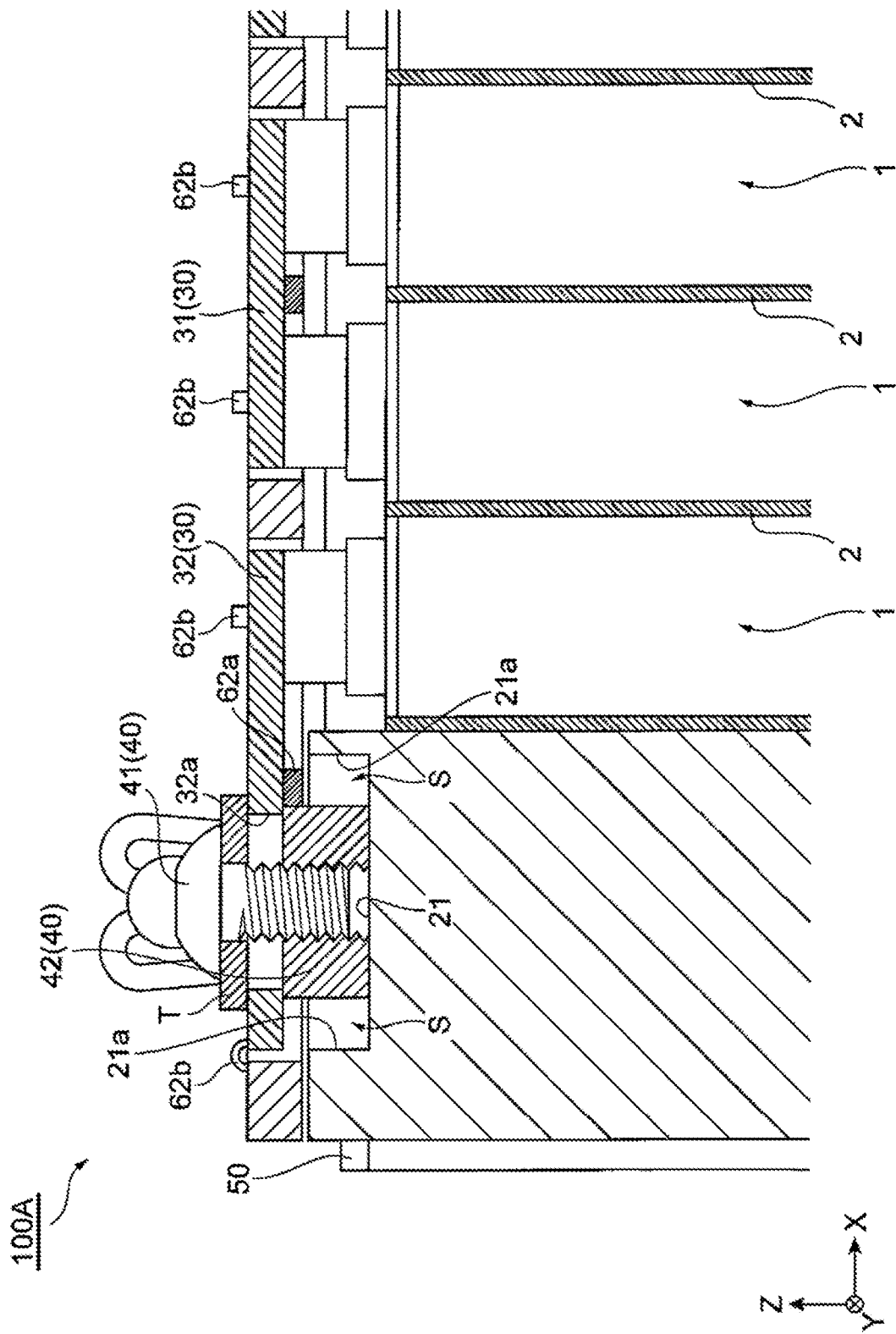
FIG. 6 is an enlarged cross-sectional view of Modified Example 1 of the battery module illustrated in FIG. 1.

FIG. 6 is an enlarged cross-sectional view of Modified Example 1 of the battery module 100 illustrated in FIG. 1. A battery module 100A of the present modified example differs from the aforementioned battery module 100 in the configuration of the support portions 62 of the bus bar case 60. The other configurations of the battery module 100A of the present modified example are similar to those of the aforementioned battery module 100. Thus, similar portions are denoted by identical reference numerals and repeated description thereof will be omitted.

In the battery module 100A of the present modified example, the gap between the support portions 62 in the direction (Z-direction) in which each bus bar 30 is fastened by the fastening member 40 is narrower than the dimension of the bus bar 30 in the fastening direction (Z-direction) while the bus bar 30 is not supported by the support portions 62 of the bus bar case 60. The support portions 62 are elastically deformed in the fastening direction (Z-direction) while each bus bar 30 is supported by the support portions 62 of the bus bar case 60 so that the bus bar 30 is sandwiched between the support portions 62 while being urged in the fastening direction (Z-direction).

More specifically, in the example illustrated in the drawing, the support portions 62 of the bus bar case 60 include a protruding portion 62b with a spring property, and the distance between the protruding portion 62b and the beam-like portion 62a in the fastening direction (Z-direction) while the bus bar 30 is not supported by the support portions 62 of the bus bar case 60 is set smaller than the thickness of the bus bar 30. In addition, the protruding portion 62b is elastically deformed in the fastening direction (Z-direction) while the bus bar 30 is supported by the support portions 62 of the bus bar case 60 so that the bus bar 30 is urged against the beam-like portion 62a in the fastening direction (Z-direction) and thus is sandwiched between the protruding portion 62b and the beam-like portion 62a. Accordingly, shakes of each bus bar 30 can be more effectively prevented when the battery module 100A shakes, such as when the battery module 100A is mounted on a vehicle, for example, and thus, resistance against shakes of the battery module 100A can be improved more.

Modified Example 2

Figure 7:
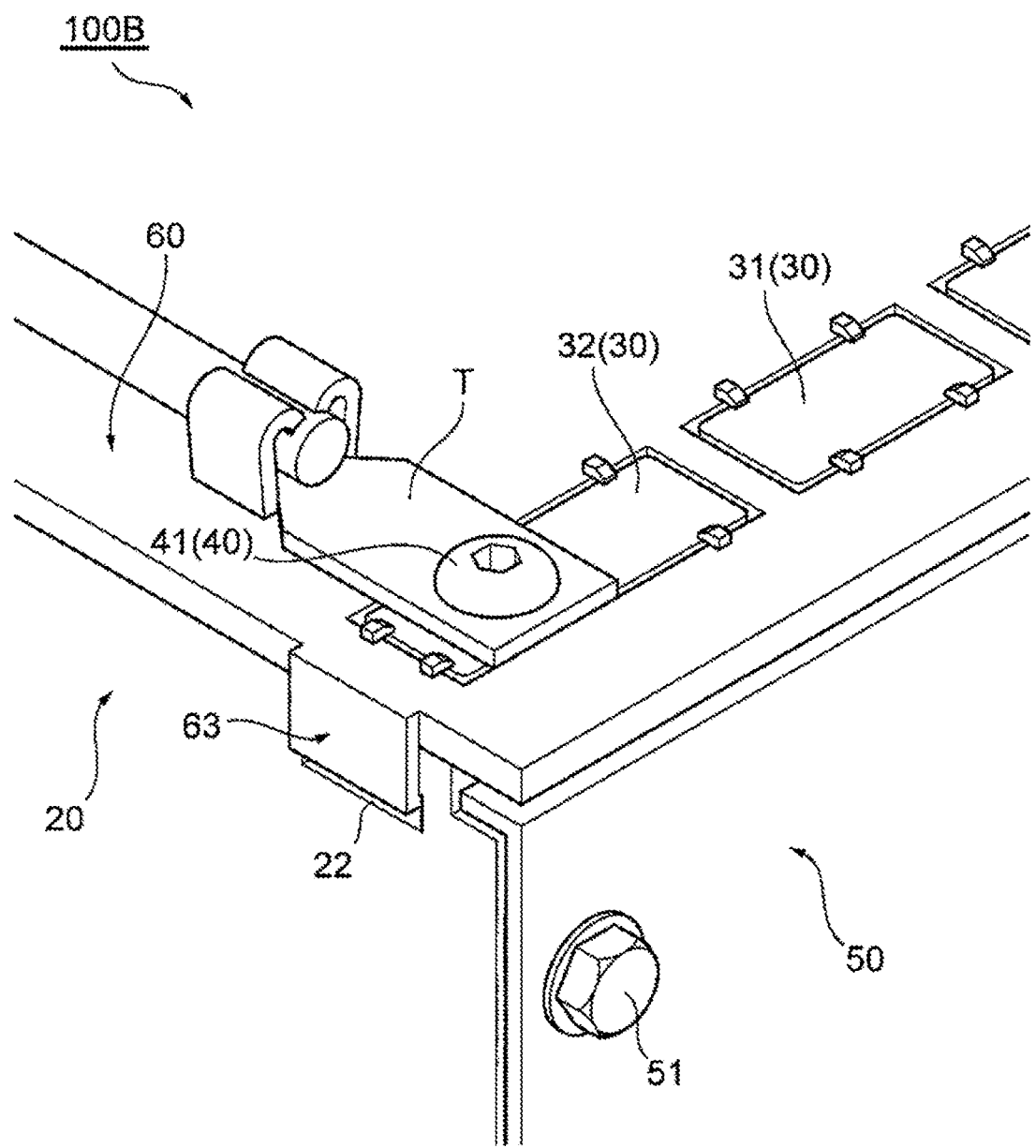
FIG. 7 is an enlarged perspective view of Modified Example 2 of the battery module illustrated in FIG. 1.
Figure 8:
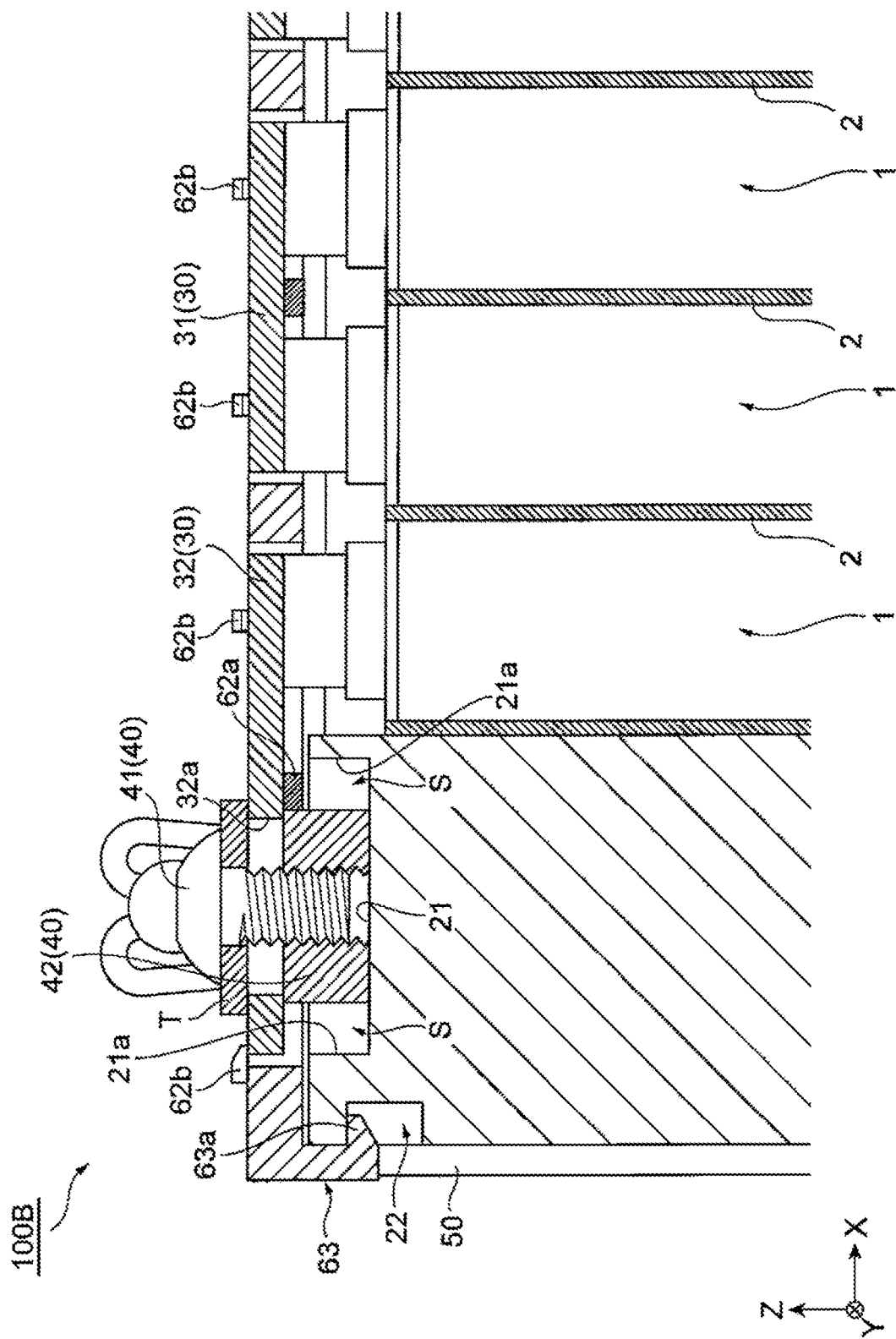
FIG. 8 is an enlarged cross-sectional view of the battery module illustrated in FIG. 7.

FIG. 7 is an enlarged cross-sectional view of Modified Example 2 of the battery module 100 illustrated in FIG. 1. FIG. 8 is an enlarged cross-sectional view of a battery module 100B illustrated in FIG. 7. The battery module 100B of the present modified example differs from the battery module 100 illustrated in FIG. 1 in the configuration of the bus bar case 60. The other configurations of the battery module 100B of the present modified example are similar to those of the aforementioned battery module 100 illustrated in FIG. 1. Thus, similar portions are denoted by identical reference numerals and repeated description thereof will be omitted.

In the battery module 100B of the present modified example, the bus bar case 60 includes engagement portions 63 adapted to engage the pair of end plates 20. In addition, the pair of end plates 20 may include recesses 22 that the engagement portions 63 of the bus bar case 60 are adapted to engage. Each engagement portion 63 of the bus bar case 60 extends toward the end plate 20 in the fastening direction (Z-direction) of each fastening member 40 at an end of the bus bar case 60, for example, and has at one end thereof a claw portion 63a protruding in the one direction (X-direction) corresponding to the stacked direction of the battery cells 1 for engaging the recess 22 of the end plate 20. Such a configuration can prevent shakes of the bus bar case 60 when the battery module 100B shakes, such as when the battery module 100B is mounted on a vehicle, for example, and thus reduce stress acting on each fastening member 40 and further improve the resistance against shakes of the battery module 100B.

Modified Example 3

Figure 9:
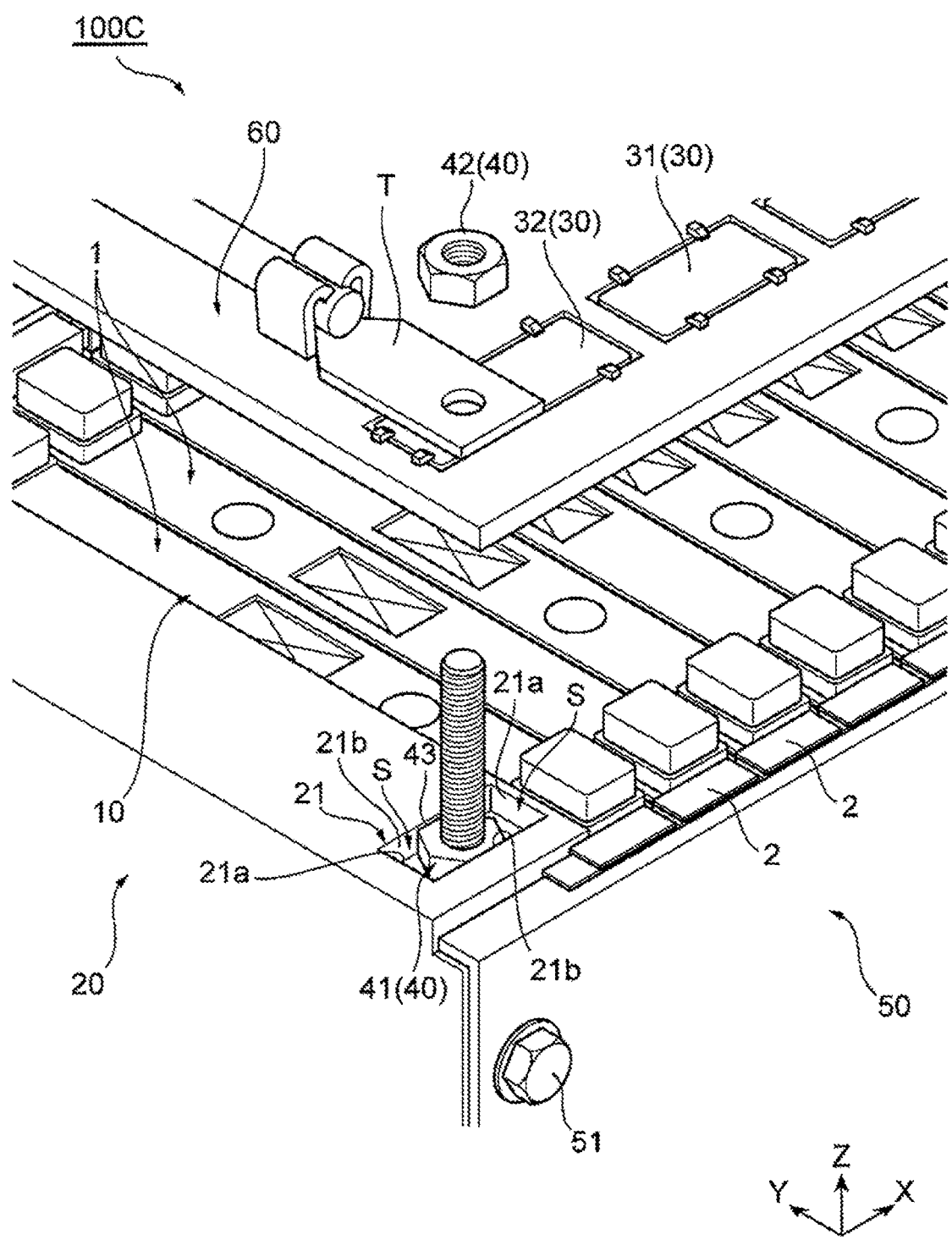
FIG. 9 is an enlarged exploded perspective view of Modified Example 3 of the battery module illustrated in FIG. 1.

FIG. 9 is an enlarged exploded perspective view of Modified Example 3 of the battery module 100 illustrated in FIG. 1. A battery module 100C of the present modified example differs from the battery module 100 illustrated in FIG. 1 in the configuration of the fastening member 40. The other configurations of the battery module 100C of the present modified example are similar to those of the aforementioned battery module 100 illustrated in FIG. 1. Thus, similar portions are denoted by identical reference numerals and repeated description thereof will be omitted.

In the battery module 100C of the present modified example, the fastening member 40 includes a bolt 41 adapted to be partially housed in the recess 21 of the end plate 20, and a nut 42 adapted to be fastened to the bolt 41. More specifically, a head of the bolt 41 is housed in the recess 21 of the end plate 20. In addition, in the battery module 100C of the present modified example, the gap S is provided between the inner side wall 21a of the recess 21 of the end plate 20 and the bolt 41 in the one direction (X-direction). In such a case also, the dimension of the head of the bolt 41 and the dimension of the recess 21 of the end plate 20 have a relationship similar to that between the dimension of the nut 42 and the dimension of the recess 21 of the end plate 20 illustrated in FIGS. 3 and 5. The battery module 100C of the present modified example also has similar advantageous effects to those of the battery module 100 illustrated in FIG. 1.

Although the embodiments of the present invention have been described in detail above with reference to the drawings, specific configurations are not limited thereto, and any design changes that are within the spirit and scope of the present invention are all included in the present invention.

REFERENCE SIGNS LIST

1 Battery cell
2 Cell holder
10 Battery cell group
20 End plate
21 Recess
21a Inner side wall
21b Inner side wall
30 Bus bar
40 Fastening member
41 Bolt
42 Nut
43 Anti-rotation wall
60 Bus bar case
62 Support portion
63 Engagement portion
100 Battery module
100A Battery module
100B Battery module
100C Battery module
S Gap
T Terminal for external connection

The invention claimed is:
1. A battery module comprising:
a battery cell group including a plurality of battery cells stacked in one direction and coupled together;
a pair of end plates sandwiching the battery cell group from opposite sides of the battery cell group in the one direction;
a bus bar for coupling the battery cell group to a terminal for external connection; and
a fastening member for fastening the terminal to the bus bar, wherein:
an end plate of the pair of end plates has a recess adapted to partially house the fastening member in a mutually movable manner in the one direction, and
a gap is provided between an inner side wall of the recess and the fastening member along the one direction.
2. The battery module according to claim 1, wherein:
the fastening member includes a nut and a bolt, the nut being adapted to be housed in the recess, the bolt being adapted to be fastened to the nut, and
the gap is provided between the inner side wall of the recess and the nut in the one direction.

3. The battery module according to claim 1, wherein:
the fastening member includes a bolt and a nut, the bolt being adapted to be partially housed in the recess, the nut being adapted to be fastened to the bolt, and
the gap is provided between the inner side wall of the recess and the bolt in the one direction.

4. The battery module according to claim 1, further comprising:
a bus bar case adapted to be arranged adjacent to the recess and hold the bus bar, the bus bar case including support portions, the support portions being adapted to support the bus bar from opposite sides of the bus bar in a fastening direction in which the bus bar and the terminal are fastened together with the fastening member.

5. The battery module according to claim 4, wherein:
a gap between the support portions in the fastening direction is narrower than a dimension of the bus bar in the fastening direction while the bus bar is not supported by the support portions, and
the support portions are elastically deformed in the fastening direction while the bus bar is supported by the support portions, thereby sandwiching the bus bar.

6. The battery module according to claim 4, wherein the bus bar case includes engagement portions adapted to engage the pair of end plates.

7. The battery module according to claim 4, wherein each of the support portions comprises a beam-like portion arranged in the center of an opening of the bus bar case in the one direction such as to cross the opening, and a plurality of protruding portions that protrude inward of the opening at opposite ends of the opening in the one direction.

8. The battery module according to claim 4, wherein, in the one direction, a dimension $L1X$ of the recess is larger than a dimension $L2X$ of a nut of the fastening member.

9. The battery module according to claim 4, wherein, in the one direction, a clearance between the recess and a nut of the fastening member corresponds to a difference between a dimension $L1X$ of the recess and a dimension $L2X$ of the nut.

10. The battery module according to claim 1, further comprising a bus bar case, the bus bar case being adapted to be arranged facing upper faces of the battery cells and hold the bus bar, wherein:
the fastening member is provided penetrating through the bus bar case and the bus bar.

11. The battery module according to claim 10, wherein the bus bar case is coupled to the pair of end plates.

12. The battery module according to claim 1, wherein a part of the fastening member housed in the recess includes an anti-rotation wall, the anti-rotation wall being adapted to be adjacent to the inner side wall of the recess along the one direction and face the inner side wall.

* * * * *